(12) United States Patent
Sasaki

(10) Patent No.: US 9,170,973 B2
(45) Date of Patent: Oct. 27, 2015

(54) USB COMMUNICATION APPARATUS AND METHOD OF REDUCING POWER CONSUMPTION AMOUNT THEREOF USING A SQUELCH SIGNAL TO INDICATE THE PRESENCE OF SIGNALS ON A USB BUS ARE AT A PREDETERMINED LEVEL

(75) Inventor: Daisuke Sasaki, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 695 days.

(21) Appl. No.: 13/247,186

(22) Filed: Sep. 28, 2011

(65) Prior Publication Data

US 2012/0079308 A1 Mar. 29, 2012

(30) Foreign Application Priority Data

Sep. 28, 2010 (JP) ................................ 2010-217098

(51) Int. Cl.
*G06F 1/00* (2006.01)
*G06F 1/26* (2006.01)
*G06F 13/40* (2006.01)

(52) U.S. Cl.
CPC ......... *G06F 13/4072* (2013.01); *Y02B 60/1228* (2013.01); *Y02B 60/1235* (2013.01)

(58) Field of Classification Search
CPC .................................................... G06F 1/3203
USPC ........................................................ 713/320
See application file for complete search history.

(56) References Cited

U.S. PATENT DOCUMENTS

| | | | | |
|---|---|---|---|---|
| 6,618,814 | B1 * | 9/2003 | Gaur et al. ..................... | 713/323 |
| 2006/0121866 | A1 * | 6/2006 | Yamamoto et al. ........... | 455/222 |
| 2006/0294287 | A1 * | 12/2006 | Motomura et al. ........... | 710/313 |
| 2010/0325450 | A1 * | 12/2010 | Kendall et al. ................ | 713/300 |

FOREIGN PATENT DOCUMENTS

JP 2006-135397 5/2006

OTHER PUBLICATIONS

UMTI+ Specification Revision 1.0 [online] Feb. 25, 2004, pp. 19-20 [retrieved on Aug. 30, 2010] Retrieved from the Internet: <URL:http://www.ulpi.org/ULP_V1_1.zi>.
USB2.0 Transceiver Macrocell Interface (UMTI) Specification Version 1.05 [online] 1999, pp. 13-15, [retrieved on Aug. 30, 2010] Retrieved from the Internet: <URL:http://www.intel.com/technology/usb/download/2_0_Xcver_Macrocell_1_05.pdf>.
Universal Serial Bus Revision 2.0 [online] pp. 119-121 [retrieved on Aug. 30, 2010] Retrieved from the Internet: <http://www.usb.org/developers/docs/usb_20_052510. zip>.

* cited by examiner

*Primary Examiner* — Thomas Lee
*Assistant Examiner* — Robert Cassity
(74) *Attorney, Agent, or Firm* — Young & Thompson

(57) ABSTRACT

A USB (Universal Serial Bus) communication apparatus includes: a driver circuit connected to a USB bus and configured to transmit a packet onto the USB bus for a packet transmission period which is determined based on a transmission request signal from another unit. A receiver control circuit generates a fixation request signal and a generation control signal in response to the transmission request signal. A receiver circuit connected to the USB bus generates a squelch signal showing that the packet is being transmitting onto the USB bus, and stops generating the squelch signal in response to the generation control signal. A line state signal control circuit is configured to output a specific line state signal based on the squelch signal to notify to another unit that the packet is been transmitting onto the USB bus, and to fix the specific line state signal in response to the fixation request signal.

12 Claims, 9 Drawing Sheets

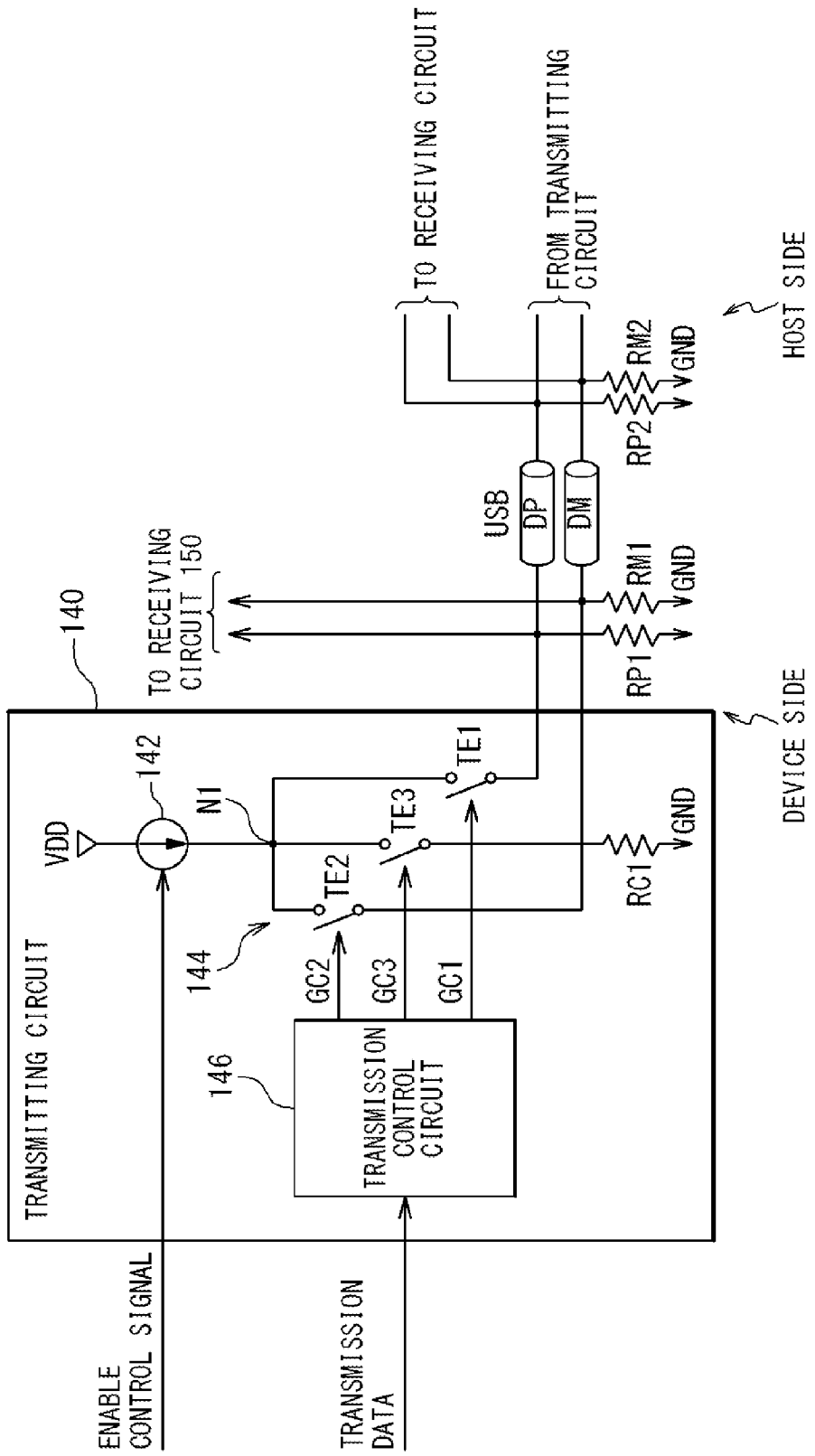

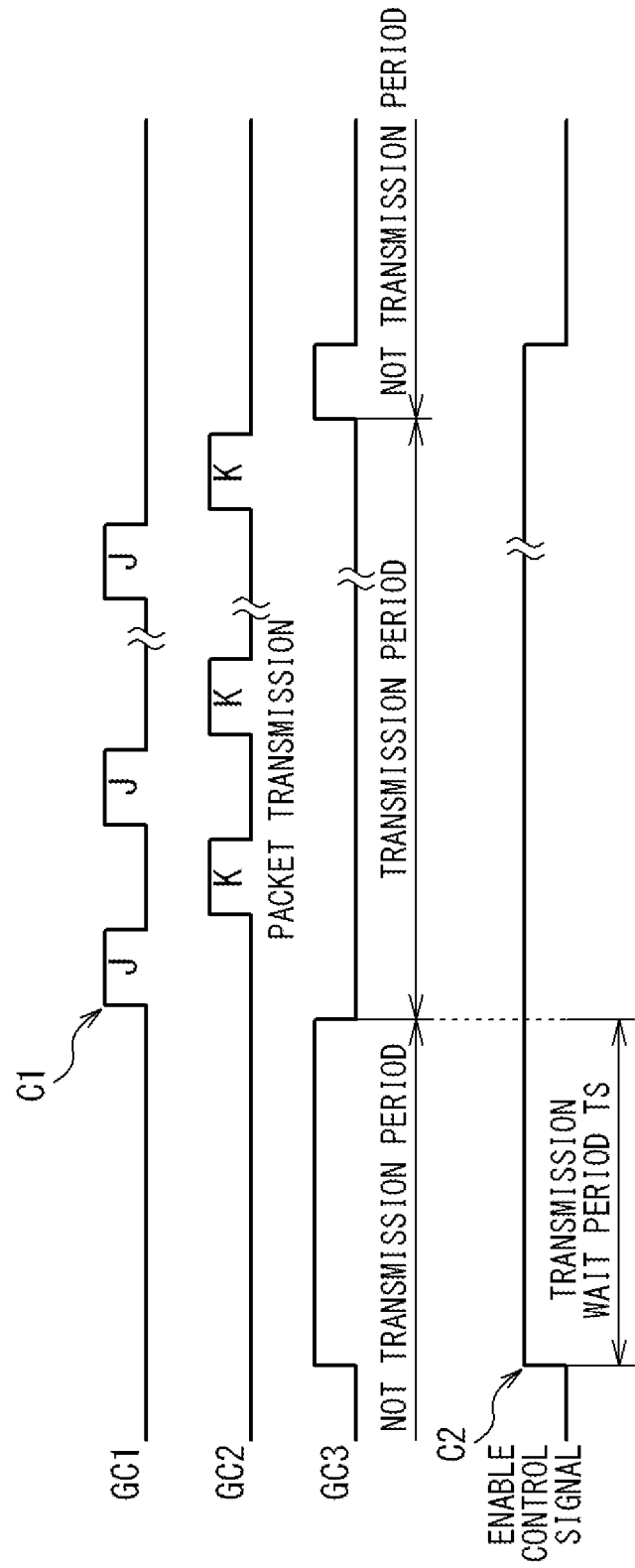

Fig. 5

| Mode | | Low Speed | Full Speed | High Speed | Chirp |
|---|---|---|---|---|---|
| XcvrSelect | | 10 | 01/11 | 00 | 00 |
| TermSelect | | 1 | 1 | 0 | 1 |
| Line State (1:0) | 00 (SE0) | SE0 | SE0 | Squelch | Squelch |
| | 01 | LS-K | FS-J | !Squelch | !Squelch & HS_Differential_Receiver_Output |
| | 10 | LS-J | FS-K | Invalid | !Squelch & !HS_Differential_Receiver_Output |
| | 11 (SE1) | SE1 | SE1 | Invalid | Invalid |

Fig. 6

| Mode | | Low Speed | Full Speed | High Speed | Chirp |
|---|---|---|---|---|---|
| XcvrSelect | | 10 | 01/11 | 00 | 00 |
| TermSelect | | 1 | 1 | 0 | 0 |
| OpMode | | don't care | don't care | 00/01/11 | 10 |
| Line State (1:0) | 00 (SE0) | SE0 | SE0 | Squelch | Squelch |
| | 01 | LS-K | FS-J | !Squelch | !Squelch & HS_Differential_Receiver_Output |
| | 10 | LS-J | FS-K | Invalid | !Squelch & !HS_Differential_Receiver_Output |
| | 11 (SE1) | SE1 | SE1 | Invalid | Invalid |

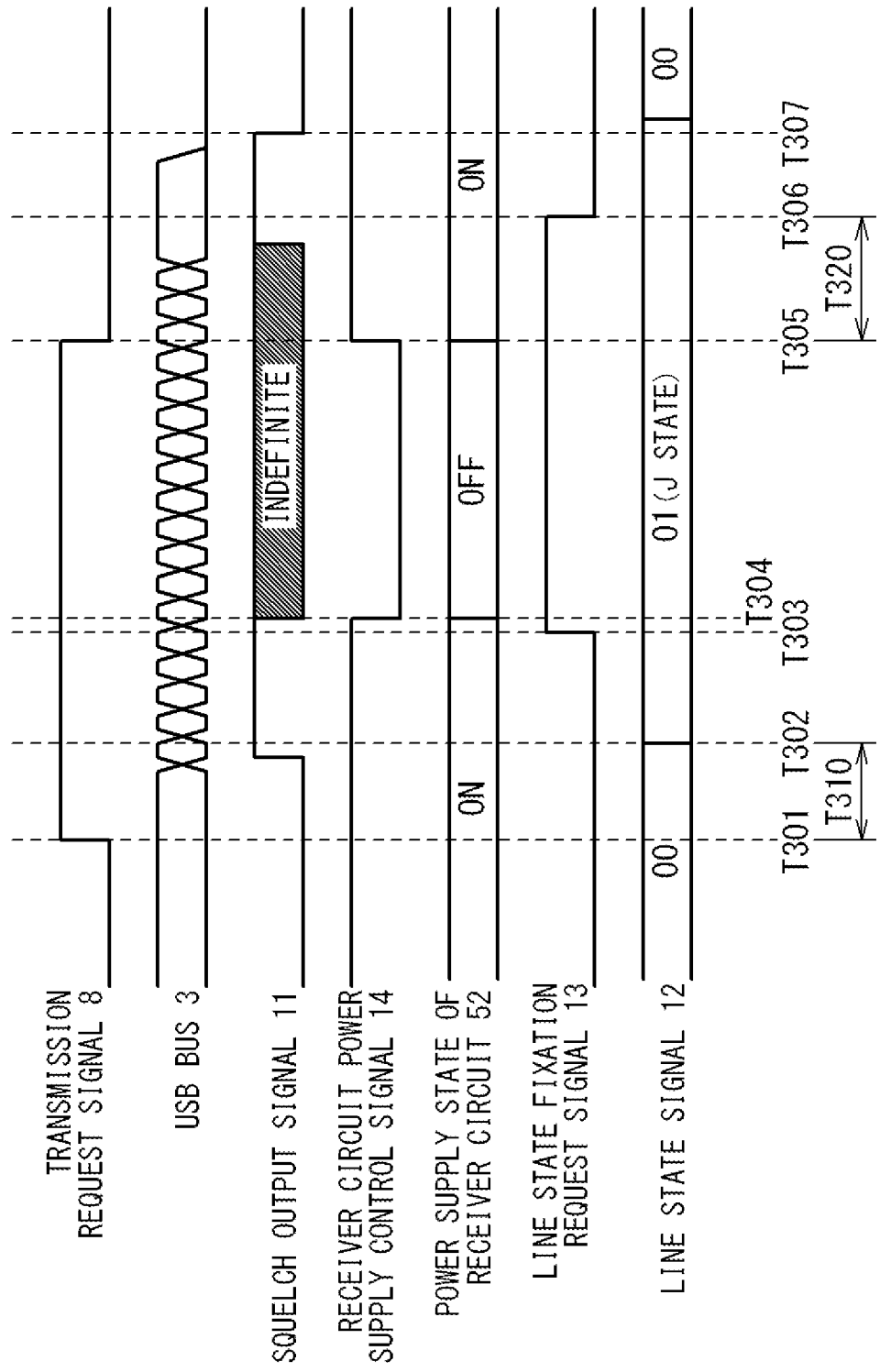

USB COMMUNICATION APPARATUS AND METHOD OF REDUCING POWER CONSUMPTION AMOUNT THEREOF USING A SQUELCH SIGNAL TO INDICATE THE PRESENCE OF SIGNALS ON A USB BUS ARE AT A PREDETERMINED LEVEL

CROSS-REFERENCE

This patent application claims a priority on convention based on Japanese Patent Application No. 2010-217098. The disclosure thereof is incorporated herein by reference.

TECHNICAL FIELD

The present invention relates to a USB (Universal Serial Bus) communication apparatus which carries out a USB communication.

BACKGROUND ART

USB (Universal Serial Bus) is a communication standard when a high speed communication is carried out between computers by using a serial bus. In recent years, examples increase in which a communication apparatus carrying out the USB communication (hereinafter, to be referred to as a USB communication apparatus) is installed in a mobile apparatus such as a digital camera or PDA (personal Digital Assistant). Such a mobile apparatus receives the supply of power from a battery. For this reason, a demand for a smaller power consumption amount is high in the USB communication apparatus installed in the mobile apparatus.

By the way, in a USB2.0 standard that is mainstream at present, there is a UTMI+(USB2.0 Transceiver Macrocell Interface) standard. The UTMI+ standard is prepared for the purpose of unifying the interfaces of a physical layer (PHY) in the USB communication apparatus based on the USB2.0 standard. However, the UTMI+ standard does not define a technique of reducing the power consumption amount. Because the power consumption amount in a circuit for the physical layer is large, the USB communication apparatus installed in the mobile device is requested to reduce the power consumption amount.

Patent Literature 1 (JP 2006-135397A) discloses a data transfer control apparatus that can save the power of the physical layer circuit. The data transfer control apparatus in Patent Literature 1 will be described below with reference to FIG. 1 to FIG. 3B.

FIG. 1 is a block diagram showing a configuration example of a data transfer control apparatus in Patent Literature 1. The data transfer control apparatus is provided with a transceiver 110, a transfer controller 170 and a data buffer (FIFO) 100.

The transceiver 110 transmits or receives a USB packet by using a differential signal line (of lines DP and DM). The transceiver 110 is provided with a logic circuit 120 as a part of a logical layer circuit of the USB, and an analog front-end circuit 130 as a physical layer circuit. The logic circuit 120 executes processes of generating and removing EOP (End Of Packet), SYNC (SYNChronization) and a line state of a differential signal (J, K, SE0 and so on). The analog front-end circuit 130 includes a transmitting circuit 140 and a receiving circuit 150. The transmitting circuit 140 transmits a packet through the USB bus. Specifically, the transmitting circuit 140 drives the differential signal line of the USB bus by using a current source 142 to be described later and consequently transmits the packet. The receiving circuit 150 receives a packet transferred through the USB bus. Specifically, in the USB bus, the line state of the differential signal line is detected, thereby receiving the packet (serial data).

The transfer controller 170 controls the data transfer through the USB bus. The transfer controller 170 is provided with an SIE (Serial Interface Engine) 180 and a buffer controller 190. The SIE 180 executes a packet process, a transaction process, a suspend resume control process and the like. The SIE 180 is provided with a packet analyzing circuit 182, a transaction controller 184 and a packet generating circuit 186. The packet analyzing circuit 182 analyzes the packet received through the USB bus by the receiving circuit 150. The transaction controller 184 executes the transaction process and instructs a transmission of the packet configuring a transaction. The packet generating circuit 186 generates a packet instructed by the transaction controller 184 and outputs it such that the generated packet is transmitted from the transmitting circuit. The buffer controller 190 executes a region reserving process of a data buffer 100 and an accessing process to the data buffer 100.

The data buffer 100 temporarily stores data transferred through the USB.

Next, FIG. 2 is a block diagram showing the configuration of the transmitting circuit 140 in the data transfer control apparatus in Patent Literature 1. The transmitting circuit 140 is provided with a current source 142, a transmission driver 144 and a transmission control circuit 146.

The current source 142 (constant current source) is placed between a power supply voltage VDD and a first node N1. The transmission driver 144 includes transistors TE1, TE2 and TE3 as shown in FIG. 2. Also, the signal line DP is connected to a termination resistor RP1 on a device side and a termination resistor RP2 on a host side. The signal line DMA is connected to a termination resistor RM1 on the device side and a termination resistor RM2 on the host side. Outputs of the transmission driver 144 are connected to the termination resistors RP1 and RM1. Similarly, outputs of the transmission driver on the host side are connected to the termination resistors RP2 and RM2. The transmission control circuit 146 generates transmission control signals GC1, GC2 and GC3 and outputs to the transmission driver 144.

FIG. 3A shows timing charts in the transmission control signals GC1, GC2 and GC3 generated by the transmission control circuit 146. In the above-mentioned configuration, when the transmission control circuit 146 activates the transmission control signal GC1, so as to turn on the transistor TE1. Then, a current from the current source 142 is supplied through the transistor TE1 to the signal line DP. On the other hand, when the transmission control circuit 146 activates the transmission control signal GC2 so as to turn on the transistor TE2. The current from the current source 142 is supplied through the transistor TE2 to the signal line DM. In a packet transmission period, the transmission control circuit 146 controls the transmission control signals GC1 and GC2 in this way and generates the line state of the differential signal line of the USB bus.

Also, in a period except the packet transmission period, the transmission control circuit 146 activates the transmission control signal GC3 so as to turn on the transistor TE3. Thus, the current from the current source 142 is supplied through the transistor TE3 to the ground GND. In this way, since the current continues to be supplied from the current source 142 to the ground GND even in the period except the packet transmission period, the voltage of the node N1 is made stable. However, since the current continues to be supplied even in the period except the packet transmission period, the power consumption amount of the transmitting circuit 140 becomes great.

For this reason, in the transmission control circuit 146 in Patent Literature 1, the output timing of the transmission control signal is changed. FIG. 3B shows timing charts in the transmission control signals GC1, GC2 and GC3 generated by the transmission control circuit 146. As shown in FIG. 3B, the transmission control circuit 146 activates the transmission control signal GC3 at a timing C2 prior to a timing C1 at which the packet is transmitted onto the USB bus.

By the above-mentioned configuration, the appropriate packet transmission is possible in the packet transmission period by using the current source 142, and a useless current can be prevented from being supplied to the ground GND in the period except the packet transmission period. Also, a length of a transmission waiting period TS between the timings C1 and C2 is set to a length enough to stabilize the current of the current source 142 and the voltage of the node N1. Consequently, as soon as the packet transmission is started, the stable current can be supplied from the current source 142 to the signal lines DP and DM.

CITATION LIST

[Patent Literature 1]: JP-P 2006-135397A
[Non-Patent Literature 1]: UMTI+ Specification Revision 1.0 [online] Feb. 25, 2004, pp. 19-20 [retrieved on 2010-08-30] Retrieved from the Internet: <URL:http://www.u1pi.org/ULP_V1_1.zi>
[Non-patent Literature 2]: USB2.0 Transceiver Macrocell Interface (UMTI) Specification Version 1.05 [online] 1999, pp. 13-15, [retrieved on 2010-08-30]Retrieved from the Internet:

<URL:http://www.intel.com/technology/usb/download/2_0_Xcver_Macrocell_1_05.pdf>

[Non-patent Literature 3]: Universal Serial Bus Revision 2.0 [online] pp. 119-121 [retrieved on 2010-08-30] Retrieved from the Internet:

<http://www.usb.org/developers/docs/usb_20_052510.zip>

SUMMARY OF THE INVENTION

However, although the data transfer control apparatus in Patent Literature 1 can attain the consumed power saving in the period except the packet transmission period, it cannot attain the consumed power saving in the packet transmission period. For this reason, a further power saving is requested.

In an aspect of the present invention, a USB (Universal Serial Bus) communication apparatus includes: a driver circuit connected to a USB bus and configured to transmit a packet onto the USB bus for a packet transmission period which is determined based on a transmission request signal from another unit. A receiver control circuit is configured to generate a fixation request signal and a generation control signal in response to the transmission request signal. A receiver circuit is connected to the USB bus, and is configured to generate a squelch signal showing that the packet is being transmitting onto the USB bus, and to stop the generation of the squelch signal in response to the generation control signal. A line state signal control circuit is configured to output a specific line state signal based on the squelch signal to notify to another unit that the packet is been transmitting onto the USB bus, and to fix the specific line state signal in response to the fixation request signal.

In another aspect of the present invention, a method of reducing a consumed power amount in a USB (Universal Serial Bus) communication apparatus, is achieved by a driver circuit transmitting a packet onto a USB bus in a packet transmission period which is determined based on a transmission request signal from another unit; by a receiver circuit detecting that the packet has been transmitted onto the USB bus; by the receiver circuit outputting a squelch signal to show that the packet is been transmitting; by notifying to the upper-layer unit that the packet is been transmitting on the USB bus, by a predetermined line state signal when the line state signal control circuit receives the squelch signal; by a receiver power supply controlling circuit controlling the line state signal control circuit to fix the line state signal in the packet transmission period; and by the receiver power supply controlling circuit controls the receiver circuit to stop control.

According to the present invention, it is possible to provide the USB communication apparatus that can save the power consumption amount even during the packet transmission in the USB communication.

BRIEF DESCRIPTION OF THE DRAWINGS

FIG. 2 is a block diagram showing a configuration of a transmitting circuit in the data transfer control apparatus in Patent Literature 1;

FIG. 3B shows timing charts of the transmission control signals GC1, GC2 and GC3 generated by the transmission control circuit in Patent Literature 1;

FIG. 5 is a truth table when the communication apparatus based on the UTMI+ standard is used as a peripheral device;

FIG. 6 is a truth table when the communication apparatus based on the UTMI+ standard is used as a host controller;

FIG. 8 shows timing charts in an operation when a packet is transmitted in the communication apparatus in the embodiment of the present invention.

DESCRIPTION OF EMBODIMENTS

Figure 1:
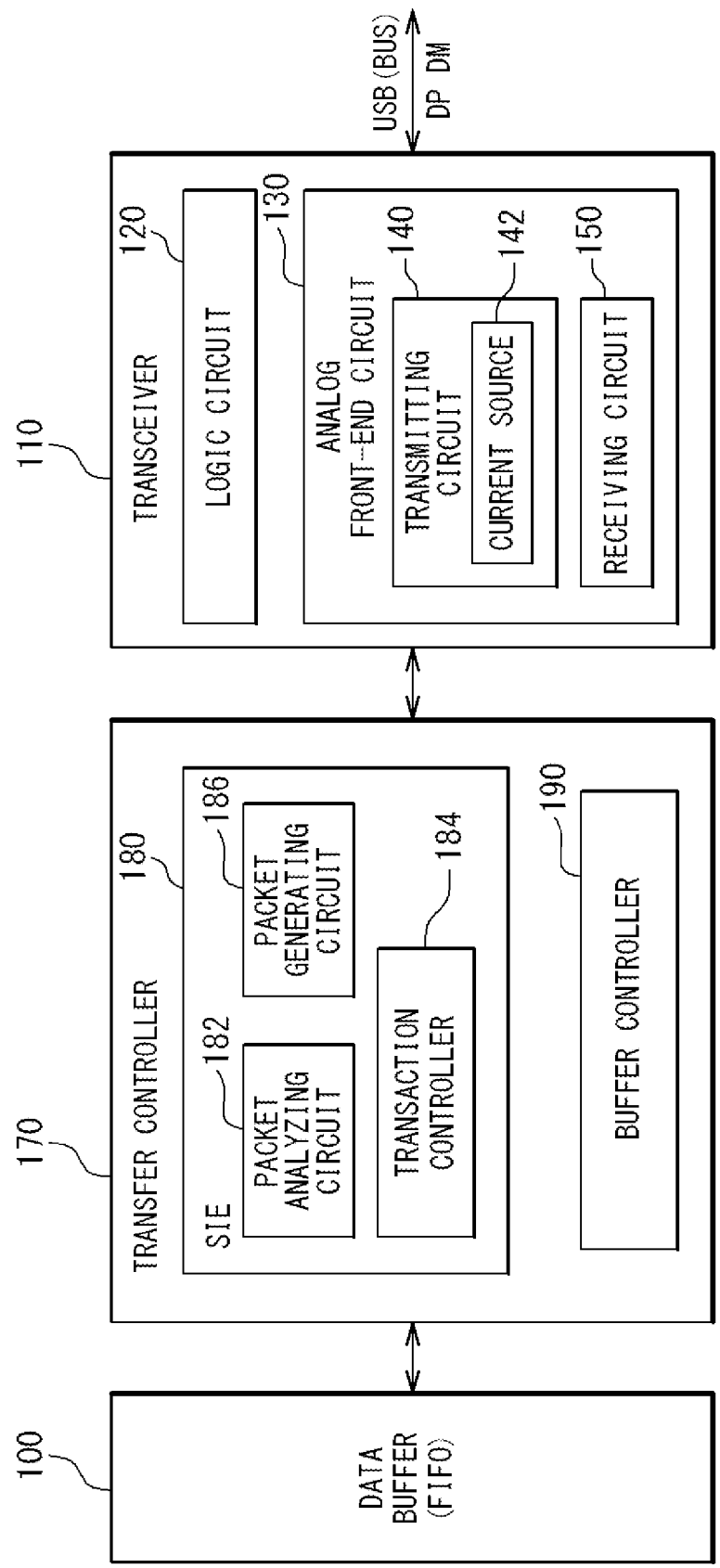
FIG. 1 is a block diagram showing a configuration example of a data transfer control apparatus in Patent Literature 1.
Figure 3A:
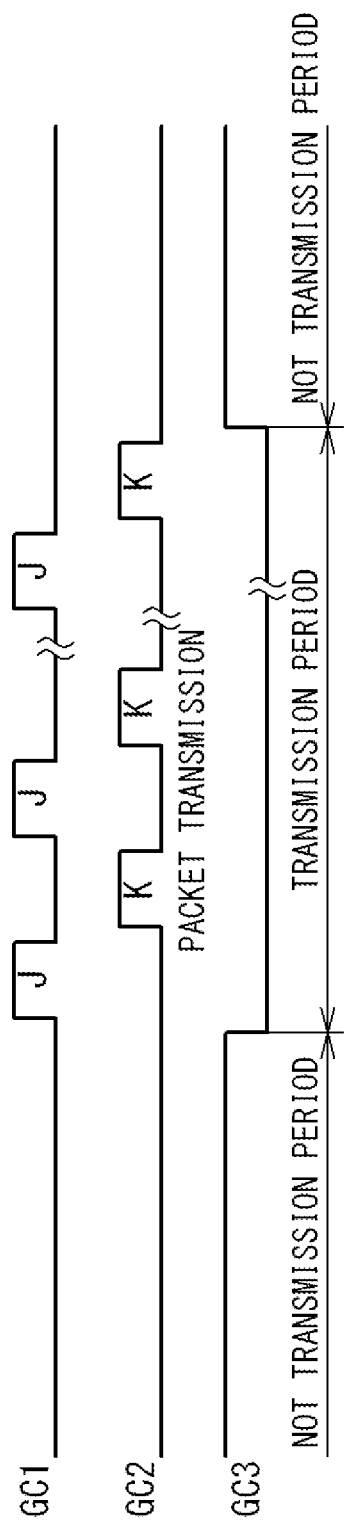
FIG. 3A shows timing charts of transmission control signals GC1, GC2 and GC3 generated by a transmission control circuit in Patent Literature 1.
Figure 4:
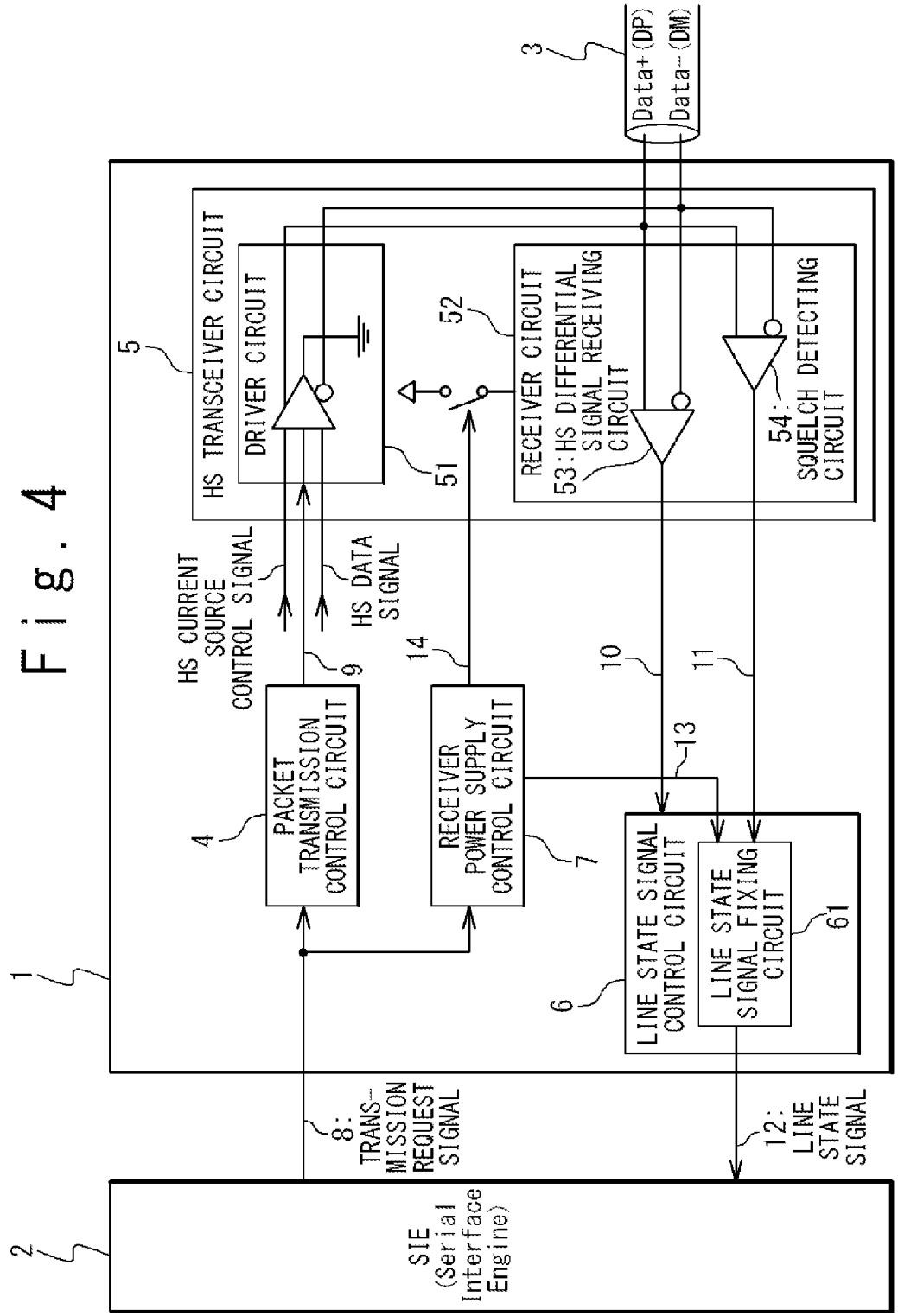
FIG. 4 is a block diagram showing a configuration of a communication apparatus according to an embodiment of the present invention.

Hereinafter, a USB communication apparatus according to the present invention will be described below with reference to the attached drawings.
(Configuration)
At first, the configuration of the USB communication apparatus according to an embodiment of the present invention will be described. FIG. 4 is a block diagram showing the configuration of the communication apparatus in this embodiment. The USB communication apparatus in this embodiment is based on the UTMI+ standard. The communication apparatus in this embodiment is provided with a physical layer circuit 1 and an SIE (Serial Interface Engine) 2 as an upper-layer unit. The SIE 2 is connected to the physical layer circuit 1. The physical layer circuit 1 is further connected to a USB bus 3 and connected through the USB bus 3 to an opposite communication apparatus.

At first, the SIE 2 is a packet transmission controller that carries out a packet handling process, a transaction management process and a suspend resume process. The SIE 2 outputs a transmission request signal (TXVALID signal) 8, which is defined by the UTMI+ standard, to the physical layer circuit 1, and controls the packet transmission of the physical layer circuit 1 in accordance with the transmission request signal 8. Also, the SIE 2 receives a line state signal 12, which is defined by the UTMI+ standard, from the physical layer circuit 1, and detects the state of the USB bus 3 from the line state signal 12.

Next, the physical layer circuit 1 is provided with a packet transmission control circuit 4, an HS (High Speed) transceiver circuit 5, a line state signal control circuit 6 and a receiver power supply control circuit 7.

At first, the packet transmission control circuit 4 is connected to the SIE 2 and a driver circuit 51 in the HS transceiver 5. The packet transmission control circuit 4 inputs the transmission request signal 8 from the SIE 2 and outputs a packet transmission control signal 9 to the driver circuit 51 in response to the transmission request signal 8.

Next, the receiver power supply control circuit 7 is connected to the SIE 2, a receiver circuit 52 and the line state signal control circuit 6. The receiver power supply control circuit 7 receives the transmission request signal 8 from the SIE 2 and outputs a line state fixing request signal 13 to the line state signal control circuit 6 in response to the transmission request signal 8. Also, the receiver power supply control circuit 7 outputs a receiver power supply control signal 14 to the receiver circuit 52 in response to the transmission request signal 8 and controls the power supply of the receiver circuit 52 in accordance with the receiver power supply control signal 14.

Next, the HS transceiver circuit 5 is a circuit for executing a transmitting/receiving process of a differential signal in a transfer speed mode of High Speed among three kinds of transfer speed modes (Low Speed/Full Speed/High Speed) of the USB standard. The HS transceiver circuit 5 is provided with the driver circuit 51 and the receiver circuit 52. It should be noted that the three kinds of the transfer speed modes (Low Speed/Full Speed/High Speed) are referred to as LS, FS and HS, respectively.

At first, the driver circuit 51 is connected to the packet transmission control circuit 4 and the USB bus 3. The driver circuit 51 receives a packet transmission control signal 9 from the packet transmission control circuit 4. Also, the driver circuit 51 receives an HS current source control signal (HS_Current_Source_Enable) and an HS data signal (HS_Data_Driver_Input) from the SIE 2. The driver circuit 51 transmits the packet to the USB bus 3 by outputting the differential signal, in which line states (Data+) and DM (Data−) of the differential signal line DP of the USB bus 3 are changed in response to the packet transmission control signal 9, a HS current source control signal and the HS data signal, like the transmitting circuit shown in FIG. 2.

Next, the receiver circuit 52 is connected to the USB bus 3, the line state signal control circuit 6 and the receiver power supply control circuit 7. The receiver circuit 52 is provided with an HS differential signal receiving circuit 53 and a squelch detecting circuit 54. The HS differential signal receiving circuit 53 and the squelch detecting circuit 54 are connected to the lines DP and DM of the differential signal line of the USB bus 3 and receive the differential signal from the differential signal line, like the driver circuit 51. Also, the HS differential signal receiving circuit 53 and the squelch detecting circuit 54 are further connected to the line state signal control circuit 6. The HS differential signal receiving circuit 53 outputs an HS differential reception signal 10 to the line state signal control circuit 6. The HS differential reception signal 10 is determined based on the differential signal received from the USB bus 3. The squelch detecting circuit 54 outputs the squelch output signal 11 to the line state signal control circuit 6 to show that the packet is being transmitting. The squelch output signal 11 is based on the differential signal received from the USB bus 3.

Next, the line state signal control circuit 6 is connected to the receiver circuit 52, the SIE 2 and the receiver power supply control signal 14. The line state signal control circuit 6 receives the HS differential reception signal 10 and the squelch output signal 11 from the receiver circuit 52 and outputs the line state signal 12 to the SIE 2. The line state signal 12 is based on the HS differential reception signal 10 and the squelch output signal 11. Also, the line state signal control circuit 6 contains a line state signal fixing circuit 61. The line state signal fixing circuit 61 receives the squelch output signal 11 from the receiver circuit 52 and the line state fixing request signal 13 from the receiver power supply control circuit 7, and masks the squelch output signal 11 and fixes or holds the line state signal 12 in a signal level in accordance with the line state fixing request signal 13.

Here, a relation between the line state signal 12 defined in the UTMI+ standard, the squelch output signal 11, and s signal of the USB bus 3 will be described. FIGS. 5 and 6 are truth tables of the line state signal in the UTMI+ standard. FIG. 5 is a truth table when the USB communication apparatus based on the UTMI+ standard is used as a peripheral device. FIG. 6 is a truth table when the USB communication apparatus based on the UTMI+ standard is used as a host controller.

In FIGS. 5 and 6, a row shows three kinds of transfer speed modes (LS/FS/HS) defined in the USB standard and a handshake (Chirp) to determine a transfer speed. The column shows signals that control the respective transfer speed modes defined in the UTMI+ standard and the handshake. In the column, Xcvr Select/Term Select/OpMode indicate input signals, and LineState indicates an output signal (line state signal 12). The line state signal 12 notifies the states DP and DM of the lines of the differential signal line in the USB bus 3 to the SIE 2 in each of the transfer speed modes and the handshake.

The line state signal 12 indicates the line state of the line DP of the differential signal line in the USB bus 3 by LineState (0) and the line state of the line DM of the differential signal line by LineState (1), in each of the transfer speed modes of the LS and the FS. Thus, as indicated on the truth tables of FIGS. 5 and 6, LineState (1:0)=01, in the states of LS-K and FS-J (the DP is at a High level, and the DM is at a Low leveland) and LineState (1:0)=10 in the states of LS-J and FS-K (the DP is at the Low level, and the DM is at the High level). Here, in the transfer speed modes of the HS and the FS, the state in which the line DP of the USB bus 3 is in the high level and the line DM is in the low level is referred to as a J-state, and the state in which the line DP is in the low level and the line DM is in the high level is referred to as a K-state. Also, in the transfer speed mode of the LS, the state in which the line DP of the USB bus 3 is in the low level and the line DM is in the high level is referred to as the J-state, and the state in which the line DP is in the high level and the line DM is in the low level is referred to as the K-state.

Also, in the transfer speed mode of the HS, the line state signal 12 indicates LineState (1:0)=01 when the USB bus 3 indicates a valid differential level (!Squelch), and indicates LineState (1:0)=00 when the USB bus 3 does not indicate the valid differential level (Squelch).

Moreover, in the Chirp mode, the line state signal 12 indicates LineState=00 when the USB bus 3 does not indicate the valid differential level (Squelch), and indicates LineState=01 when the USB bus 3 indicates the valid differential level and a differential reception input is in the high level (the line DP is in the high level and the line DM is in the low level), and then indicates LineState=10 when the differential reception input is in the low level (the line DP is in the low level, and the line DM is in the high level).

In this way, it is defined in the UTMI+ standard that the line state signal 12 is fixed to the J-state (LineState (1:0)=01) for a period while the packet is transmitted or received onto or from the USB bus 3 (in short, the USB bus 3 indicates the valid differential level (!Squelch), in the transfer speed mode of the HS. The line state signal control circuit 6 can forcedly set the line state signal 12 to the J-state, by referring to the squelch output signal 11 in the transfer speed mode of the HS. Consequently, it is possible to minimize the change in the line state signal 12. It should be noted that the details of the USB2.0 standard and the UTMI+ standard as mentioned above are described in Non-Patent Literatures 1 to 3.

Referring to FIG. 4 again, when the description is carried out by applying the above standard, the squelch detecting circuit 54 in the receiver circuit 52 receives the differential signal, which is outputted to the USB bus 3 from the driver circuit 51, for a period while the driver circuit 51 transmits the packet to the USB bus 3 (or, for the period while an opposing USB communication apparatus transmits the packet to the USB bus 3). When detecting that the USB bus 3 indicates the valid differential level, the squelch detecting circuit 54 outputs the squelch output signal in the high level to the line state signal control circuit 6. When receiving the squelch output signal in the high level, the line state signal control circuit 6 outputs the line state signal 12 in the J-state (LineState (1:0)= 01). The SIE 2 can detect that the packet is being transmitted onto the USB bus 3, because the line state signal 12 is in the J-state.

In this way, while the driver circuit 51 transmits the packet, the squelch detecting circuit 54 must continue to notify the state of the USB bus 3 to the line state signal control circuit 6 by using the squelch output signal 11. This is because the line state signal control circuit 6 sets the line state signal 12 to the J-state in response to the squelch output signal 11 in the high level. For this reason, even during the packet transmission from the driver circuit 51, the receiver circuit 52 is required to be driven, which results in the increase in a power consumption amount.

In the USB communication apparatus in this embodiment, the receiver power supply control circuit 7 detects the period of a packet transmission executed by the driver circuit 51 in response to the transmission request signal 8 and controls the line state signal fixing circuit 61 to fix the level of the line state signal to the J-state in accordance with the line state fixing request signal 13 for the packet transmission period. Then, the receiver power supply control circuit 7 turns off the power supply of the receiver circuit 52 in response to the receiver power supply control signal 14 for the packet transmission period.

Consequently, even during the packet transmission executed by the driver circuit 51, it is possible to reduce the power consumption amount of the receiver circuit 52. Also, the line state signal fixing circuit 61 masks the squelch output signal 11 outputted from the squelch detecting circuit 54 and fixes the line state signal 12 to the J-state. Consequently, the SIE 2 can accurately detect the state of the USB bus 3, even when the power supply of the receiver circuit 52 is turned off.

Figure 7:
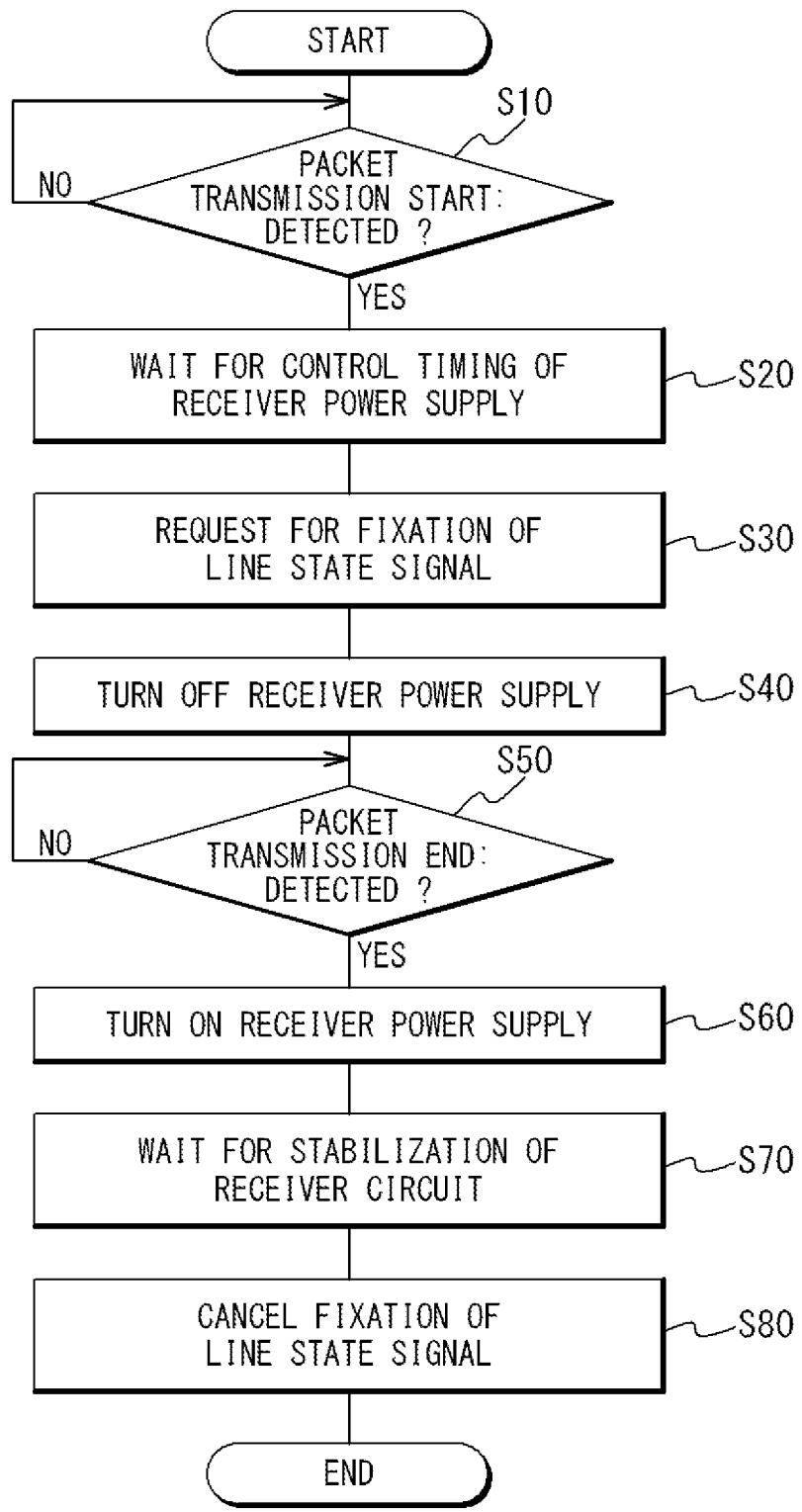
FIG. 7 is a flowchart showing an operation of a receiver power supply control circuit of the communication apparatus according to the embodiment of the present invention.

An operation of the USB communication apparatus in this embodiment will be described below. FIG. 7 is a flowchart showing the operation of the receiver power supply control circuit 7 in this embodiment. Also, FIG. 8 shows timing charts in the operation when the packet is transmitted in the USB communication apparatus in this embodiment. It should be noted that in the following description, the USB communication apparatus is based on the UTMI+ standard and the transfer speed mode is the HS.

At first, the receiver power supply control circuit 7 determines whether or not the start of the packet transmission is detected (Step S10 in FIG. 7). The receiver power supply control circuit 7 detects the start of the packet transmission on the basis of the transmission request signal 8 outputted from the SIE 2. The SIE 2 carries out a control based on the UTMI+ standard such that the transmission request signal 8 is in the high level when the packet transmission is started and the transmission request signal 8 is in the low level when the packet transmission is completed. When the start of the packet transmission cannot be detected (No of Step S10 in FIG. 7) since the transmission request signal 8 is in the low level, the control flow is set to a waiting state at this step. On the other hand, when the start of the packet transmission is detected (Yes of Step S10 in FIG. 7 since the transmission request signal 8 is in the high level, the control flow proceeds to a step S20.

When detecting the start of the packet transmission in response to the high level or rising edge of the transmission request signal 8 from the SIE 2 (Time T301 in FIG. 8), the packet transmission control circuit 4 issues the packet transmission control signal 9 to control the packet transmission of the driver circuit 51 in the HS transceiver circuit 5. The driver circuit 51 transmits the packet onto the USB bus 3 in response to the packet transmission control signal 9. Also, simultaneously, the receiver power supply control circuit 7 detects the start of the packet transmission, namely, the start of the packet transmission period, on the basis of the high level or rising edge of the transmission request signal 8. When detecting the start of the packet transmission, the receiver power supply control circuit 7 enters a waiting state to wait for a timing at which the power supply of the receiver circuit 52 is controlled (Step S20 in FIG. 7).

Since the USB bus 3 can transfer a signal bi-directionally, the differential signal transmitted as the packet by the driver circuit 51 is also received by the receiver circuit 52. The squelch detecting circuit 54 in the receiver circuit 52 outputs the squelch output signal 11 in the high level to the line state signal control circuit 6 in response to the reception of the differential signal. When receiving the squelch output signal 11 in the high level, the line state signal control circuit 6 outputs the line state signal 12 of the J-state (Time T302 in FIG. 8). It should be noted that when receiving the differential signal, the HS differential signal receiving circuit 53 in the receiver circuit 52 outputs the HS differential reception signal 10 to the line state signal control circuit 6. However, in the case of the transfer speed mode of the HS, the HS differential reception signal 10 has no influence on the generation of the line state signal 12.

A period T310 from the rising edge of the transmission request signal 8 at the time T301 in FIG. 8 to the transition of the line state signal 12 to the J-state at the time T302 is determined based on circuit parameters such as the number of stages of flip-flops and circuit delays in the packet transmission control circuit 4, the driver circuit 51, the receiver circuit 52 and the line state signal control circuit 6. The receiver power supply control circuit 7 waits for the period T310 by counting by a counter circuit (not shown).

After the elapse of the period T310, the receiver power supply control circuit 7 outputs the line state fixing request signal 13 in the high level to the line state signal fixing circuit 61 (Step S30 in FIG. 7). When detecting the line state fixing request signal 13 in the high level, the line state signal fixing circuit 61 masks the squelch output signal 11 and fixes the line state signal 12 to the J-state (Time T303 in FIG. 8).

When the line state signal 12 is fixed to the J-state, the receiver power supply control circuit 7 turns off the receiver power supply control signal 14 so as to turn off the power supply of the receiver circuit 52 (Step S40 in FIG. 7 and Time T304 in FIG. 8). After that, the driver circuit 51 continues the packet transmission.

The receiver power supply control circuit 7 determines whether or not the packet transmission has been completed (Step S50). The SIE 2 controls the transmission request signal 8 to the low level based on the UTMI+ standard at the time of the packet transmission completion. The receiver power supply control circuit 7 detects the completion of the packet transmission, namely, the completion of the packet transmission period, in response to falling edge of the transmission request signal 8 (Yes of Step 50 in FIG. 7 and Time T305 in FIG. 8). On the other hand, when the completion of the packet transmission cannot be detected, the receiver power supply control circuit 7 waits for the completion of the packet transmission (No of Step S50 in FIG. 7). When detecting the completion of the packet transmission, the receiver power supply control circuit 7 turns on the receiver power supply control signal 14 so as to turn on the power supply of the receiver circuit 52 (Step S60 in FIG. 7 and Time T305 in FIG. 8).

After turning on the power supply of the receiver circuit 52, the receiver power supply control circuit 7 waits for the stabilization of the operation of the receiver circuit 52 (Step S70 in FIG. 7). By use of a counter circuit (not shown), the receiver power supply control circuit 7 waits for a period T320 from a time when the power supply of the receiver circuit 52 is turned on at the time T305 in FIG. 8 to a time when the operation of the receiver circuit 52 becomes stable at a time T306 in FIG. 8, and the squelch output signal 11 from the squelch detecting circuit 54 in the receiver circuit 52 is determined.

When the operation of the receiver circuit 52 becomes stable and the squelch output signal 11 from the squelch detecting circuit 54 is determined, the receiver power supply control circuit 7 transits the line state fixing request signal 13 to the low level (Step S80 in FIG. 7). The line state signal fixing circuit 61 cancels the fixation of the line state signal 12 in response to the line state fixing request signal 13 in the low level (Time T306 in FIG. 8).

When the driver circuit 51 has completed the packet transmission, the squelch detecting circuit 54 transits the squelch output signal 11 to the low level (Time T 307 in FIG. 8). After that, the line state signal control circuit 6 shifts the line state signal 12 from the J-state to SE0 in response to the squelch output signal 11.

According to the USB communication apparatus of the present invention, there is the effect of reducing the power consumption amount during the packet transmission. The reason is in that the receiver power supply control circuit 7 controls the line state signal fixing circuit 61 to mask the squelch output signal 11 from the squelch detecting circuit 54 for the period of the packet transmission and to fix the line state signal 12 to the J-state and to turn off the power supply of the receiver circuit 52. The receiver power supply control circuit 7 detects the start of the packet transmission in response to the rising edge of the transmission request signal 8 outputted from the SIE 2 and detects the completion of the packet transmission in response to the falling edge of the transmission request signal 8. Also, the line state signal fixing circuit 61 masks the squelch output signal and further fixes the line state signal. For this reason, even if the power supply of the receiver circuit 52 is turned off, the SIE 2 can accurately detect that the driver circuit 51 is transmitting the packet onto the USB bus 3.

It should be noted that in the present embodiment, the receiver power supply control circuit 7 turns on/off the power supply of the receiver circuit 52. However, it is possible to attain the similar effect even by controlling switching between the operational state and the halting state of the receiver circuit 52 in response to an operation control signal generated by the circuit 7 without turning on/off the power supply.

As mentioned above, the present invention has been described by referring to the embodiments. However, the present invention is not limited to the above-mentioned embodiment. Various modifications that can be understood by one skilled in the art can be made within the scope of the present invention to the configuration and detail of the present invention.

What is claimed is:

1. A USB (Universal Serial Bus) communication apparatus comprising:
a driver circuit connected to a USB bus and configured to transmit a packet onto said USB bus for a packet transmission period which is determined based on a transmission request signal from another unit;
a receiver control circuit configured to generate a fixation request signal and a generation control signal in response to the transmission request signal;
a receiver circuit connected to said USB bus, and configured to receive said packet onto said USB bus and to detect a level of signals transmitted on said USB bus so as to generate a squelch signal, and to stop detection of said squelch signal in response to said generation control signal;
a line state signal control circuit configured to generate a specific line state signal based on said squelch signal that indicates that the signals transmitted on said USB bus are at a valid level, and to fix said specific line state signal in response to said fixation request signal; and
a switch connecting a power supply to said receiver circuit, said switch being operated by the generation control signal,
wherein said fixation request signal and said generation control signal are activated during the packet transmission period, and
wherein said switch disconnects the power supply from said receiver circuit during the packet transmission period based on said generation control signal.

2. The USB communication apparatus according to claim 1, wherein said receiver control circuit issues said fixation request signal to control said line state signal control circuit to fix said line state signal, when detecting a start of said packet transmission period.

3. The USB communication apparatus according to claim 2, wherein said receiver control circuit controls said line state signal control circuit to fix said line state signal, after said line state signal is outputted from said line state signal control circuit when detecting the start of said packet transmission period.

4. The USB communication apparatus according to claim 2, wherein said receiver control circuit detects the start of said packet transmission period based on a rising edge of said transmission request signal.

5. The USB communication apparatus according to claim 1, wherein said receiver control circuit controls said line state signal control circuit to cancel the fixation of said line state signal, when detecting an end of said packet transmission period.

6. The USB communication apparatus according to claim 5, wherein said receiver control circuit controls said line state signal control circuit to cancel the fixation of said line state signal, after a state of said squelch signal outputted from said receiver circuit is fixed, when detecting the end of said packet transmission period.

7. The USB communication apparatus according to claim 5, wherein said receiver control circuit detects the end of said packet transmission period based on a falling edge of said transmission request signal.

8. The USB communication apparatus according to claim 1, wherein said line state signal control circuit masks said squelch signal for a period while said line state signal is fixed.

9. The USB communication apparatus according to claim 1, wherein said receiver circuit controls the fixation or the cancellation of the fixation of said line state signal in response to said fixation request signal,
wherein said line state signal control circuit comprises a line state signal fixing circuit configured to receive said fixation request signal and said squelch signal, and to fix or cancel the fixation of said line state signal based on said fixation request signal.

10. The USB communication apparatus according to claim 9, wherein said line state fixing circuit masks said squelch signal for the period that said line state signal is fixed.

11. A method of reducing a consumed power amount in a USB (Universal Serial Bus) communication apparatus, comprising:

a driver circuit transmitting a packet onto a USB bus in a packet transmission period which is determined based on a transmission request signal from an upper-layer unit;

a receiver control circuit generating a fixation request signal and a generation control signal in response to said transmission request signal;

a receiver circuit connected to said USB bus and receiving said packet onto said USB bus, and detecting a level of signals transmitted on said USB bus so as to generate a squelch signal, and stopping detection of said squelch signal in response to said generation control signal wherein said receiver circuit is connected to a power supply through a switch;

notifying said upper-layer unit that the packet is been transmitting on said USB bus, by a predetermined line state signal when said line state signal control circuit receives said squelch signal that indicates that the signals transmitted on said USB bus are at a valid level;

a receiver power supply controlling circuit controlling said line state signal control circuit to fix said line state signal in said packet transmission period and generating a power supply control signal that operates the switch;

activating said fixation request signal and said generation control signal during the packet transmission period; and said receiver power supply controlling circuit controlling said receiver circuit to stop control and disconnecting the power supply from the receiver circuit by operating the switch during the packet transmission period based on said generation control signal.

12. The USB communication apparatus according to claim 1, wherein said specific line state signal is fixed irrespective of said squelch signal while said fixation request signal is activated.

* * * * *